March 6, 1956    L. L. CHATMAN ET AL    2,737,099
APPARATUS FOR PHOTOPRINTING
Filed Sept. 11, 1951        4 Sheets-Sheet 1

INVENTORS
LESTER L. CHATMAN &
BY MILBURN G. STEVENS

William Cleland
ATTORNEY

March 6, 1956 L. L. CHATMAN ET AL 2,737,099
APPARATUS FOR PHOTOPRINTING
Filed Sept. 11, 1951 4 Sheets-Sheet 2

INVENTORS
LESTER L. CHATMAN &
MILBURN G. STEVENS
BY
William C Cleland
ATTORNEY

March 6, 1956
L. L. CHATMAN ET AL
2,737,099
APPARATUS FOR PHOTOPRINTING
Filed Sept. 11, 1951
4 Sheets-Sheet 3
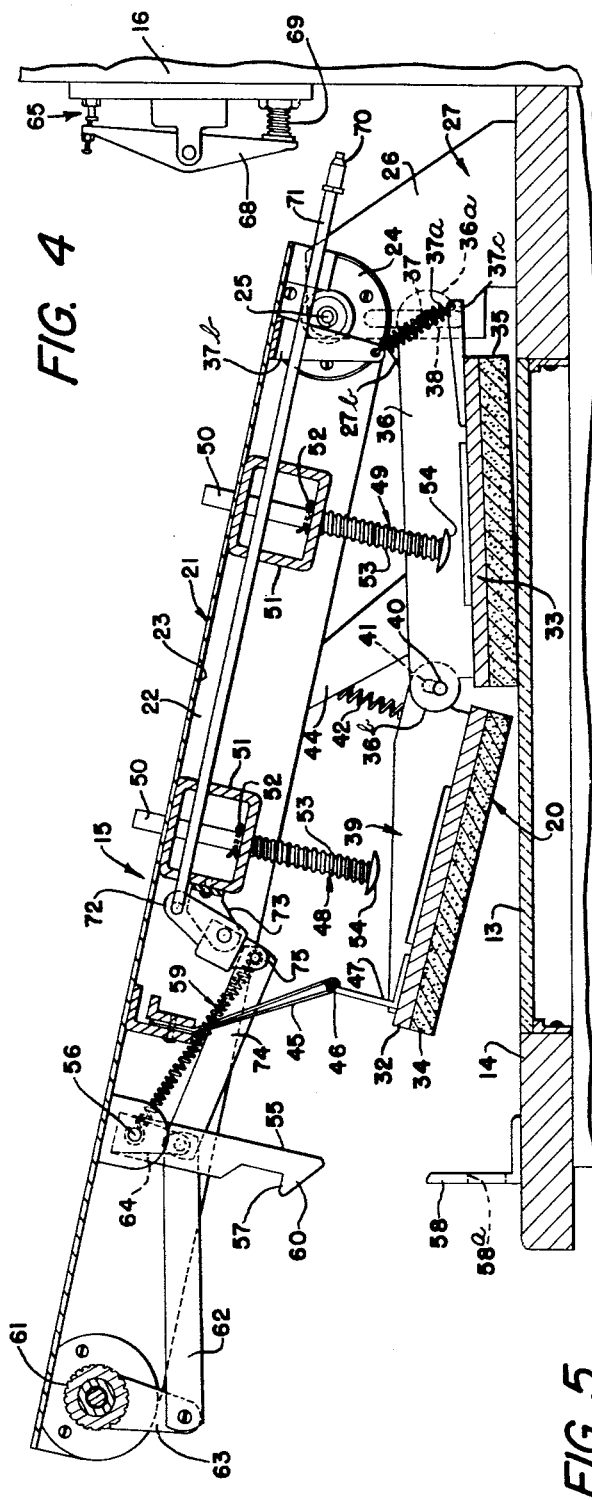
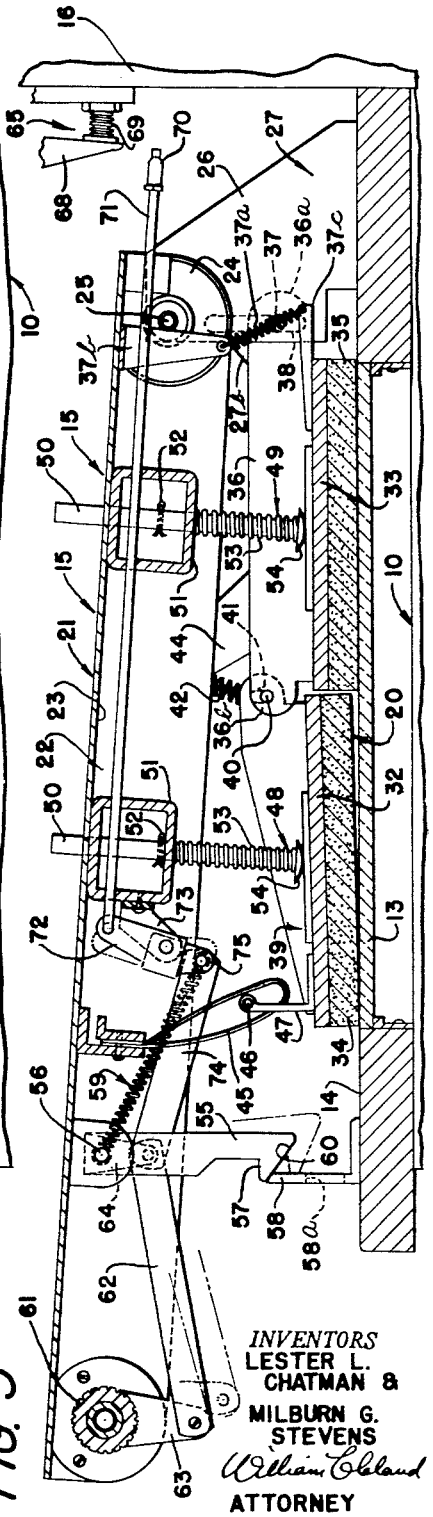
INVENTORS
LESTER L. CHATMAN &
MILBURN G. STEVENS
William Cleland
ATTORNEY March 6, 1956 L. L. CHATMAN ET AL 2,737,099
APPARATUS FOR PHOTOPRINTING
Filed Sept. 11, 1951 4 Sheets-Sheet 4
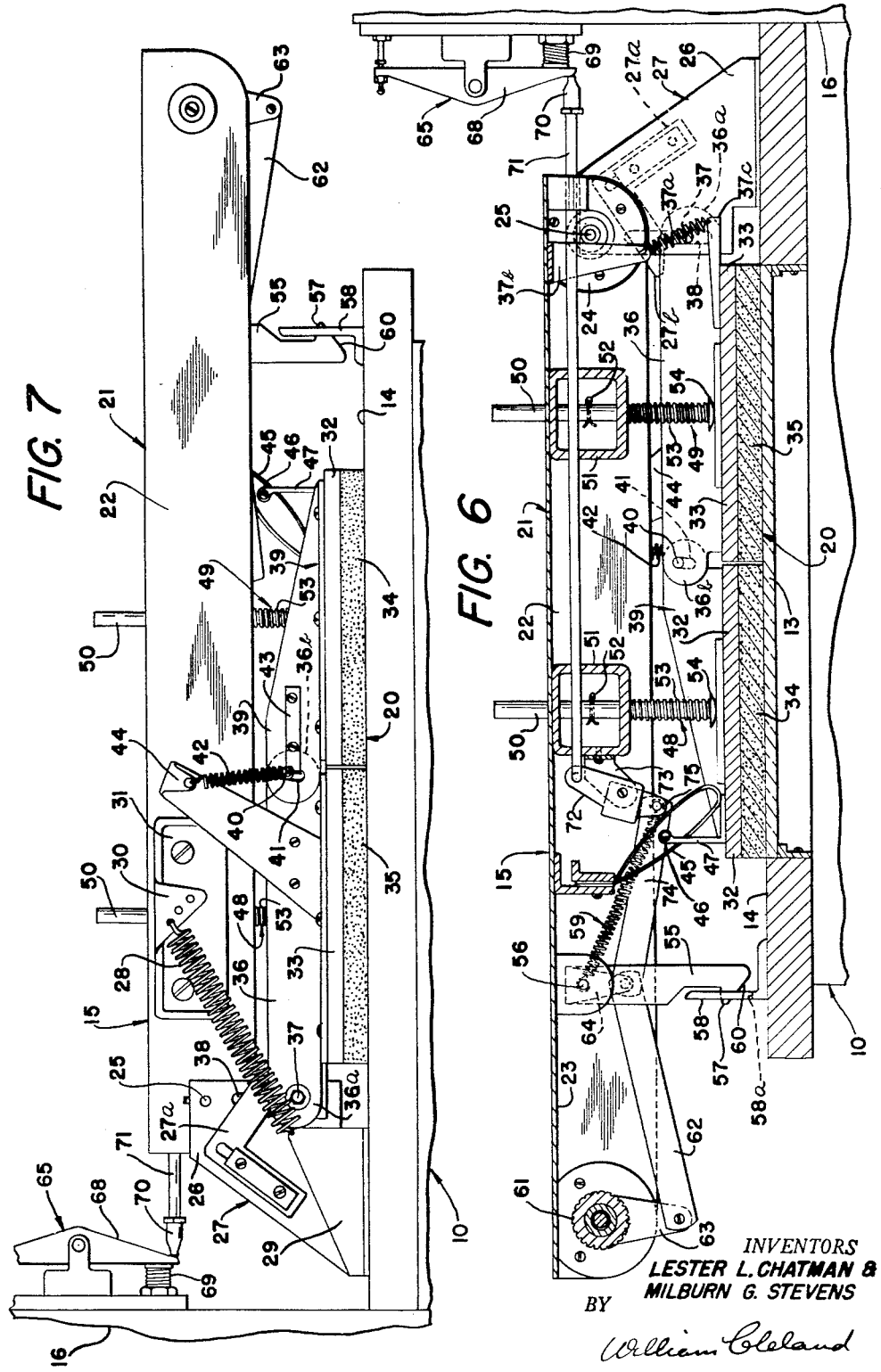
INVENTORS
LESTER L. CHATMAN &
MILBURN G. STEVENS
BY
William Cleland
ATTORNEY United States Patent Office 2,737,099
Patented Mar. 6, 1956

2,737,099

APPARATUS FOR PHOTOPRINTING

Lester L. Chatman and Milburn G. Stevens, Akron, Ohio; said Stevens assignor to said Chatman Application September 11, 1951, Serial No. 246,102

7 Claims. (Cl. 95—73)

This invention relates to an apparatus for making contact photoprints from negatives.

Heretofore, there has been available on the market photoprinting machines of the type utilizing either a one-piece flexible pressure platen or a segmental pressure platen for holding sensitized paper over a negative upon the usual transparent plate of a housing enclosing illuminating means. Considerable difficulty has been experienced, however, in that such one-piece flexible pads upon being progressively applied from the rear edge toward the front edge of the same, to flat condition on the plate, tended to slide the paper out of centered relation with respect to the negative. Segmental types of platens in addition to this fault have been objectionable because of a tendency thereto to buckle or wrinkle the paper. In either case a great deal of printing paper has been wasted due to wrinkling of the paper, resulting in blurred or otherwise defective prints, or to the pictures being poorly centered on the paper.

One object of the present invention is to provide apparatus for making photographic prints or the like, by means of which the sensitized paper is firmly held against the transparent plate of illumination housing in a manner which assures maintenance of the paper in desired centered relation over the negative, and which obviates wrinkling or buckling of the paper, thereby reducing to a minimum the making of damaged or unacceptable prints.

Another object of the invention is to provide apparatus of the character described including improved positive means for initiating operation of the illuminating means only after the sensitized paper is firmly positioned on the transparent plate.

Other objects of the invention will be manifest from the following brief description and the accompanying drawings.

Of the accompanying drawings:

Figure 4 is a transverse cross-section, partly broken away, taken substantially on the line 5—5 of Figure 2, bent in a partly closed position of the platen mechanism in which a rear platen segment is making initial pressure contact with the top of the illumination housing.

Figure 5 is a view similar to Figure 4, but illustrating the platen segments in an intermediate position of pressure contact.

Figure 6 is a similar cross-section on the line 5—5 of Figure 1, but illustrating the platen segments in full pressure contact with the illumination housing.

Figure 7 is a transverse cross-section taken substantially on the line 7—7 of Figure 2, illustrating a side view of the platen mechanism in closed position.

Figure 1:
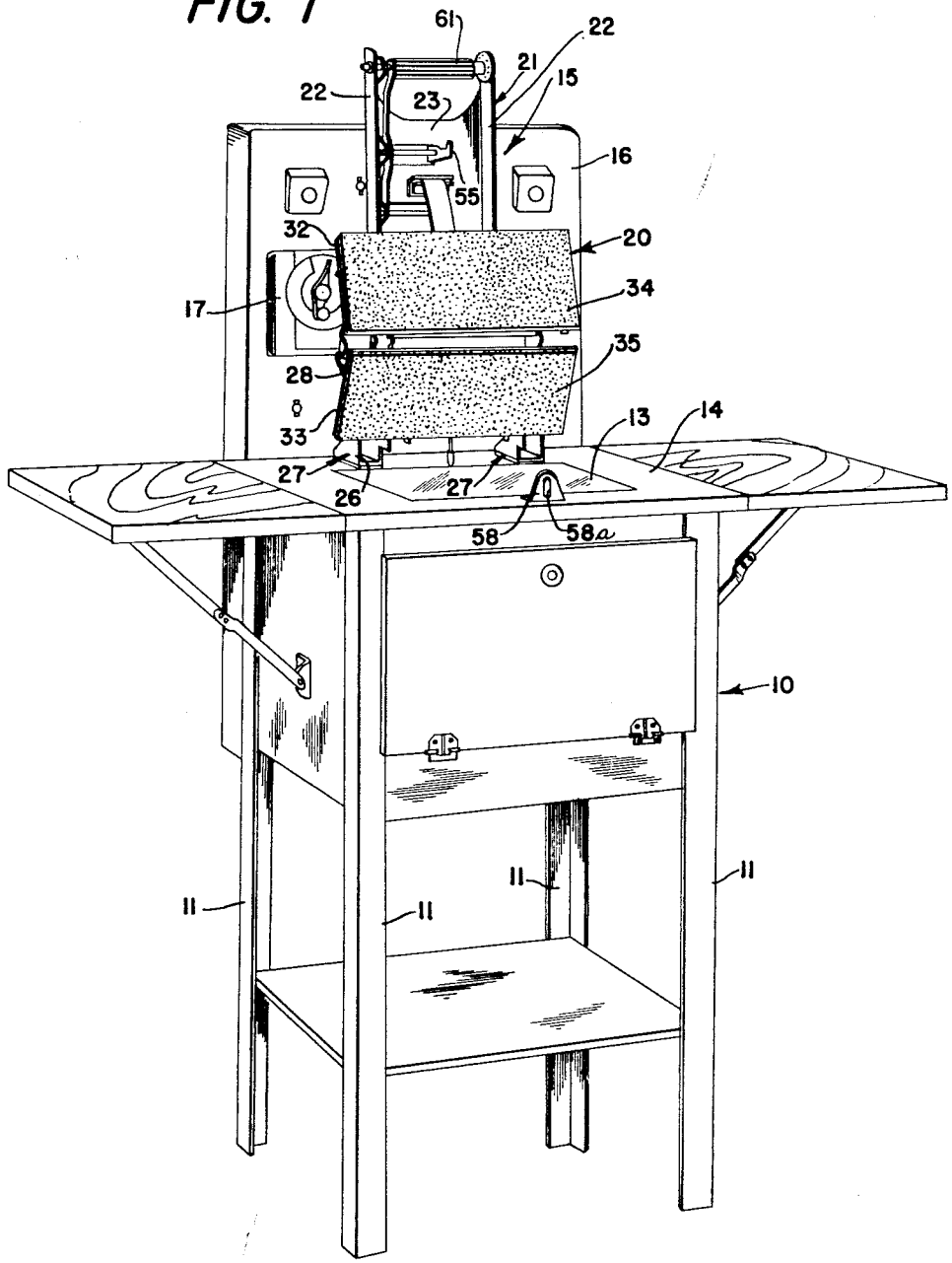
Figure 1 is a front perspective view of a photoprinting machine with a pressure platen mechanism thereof in open position.
Figure 2:
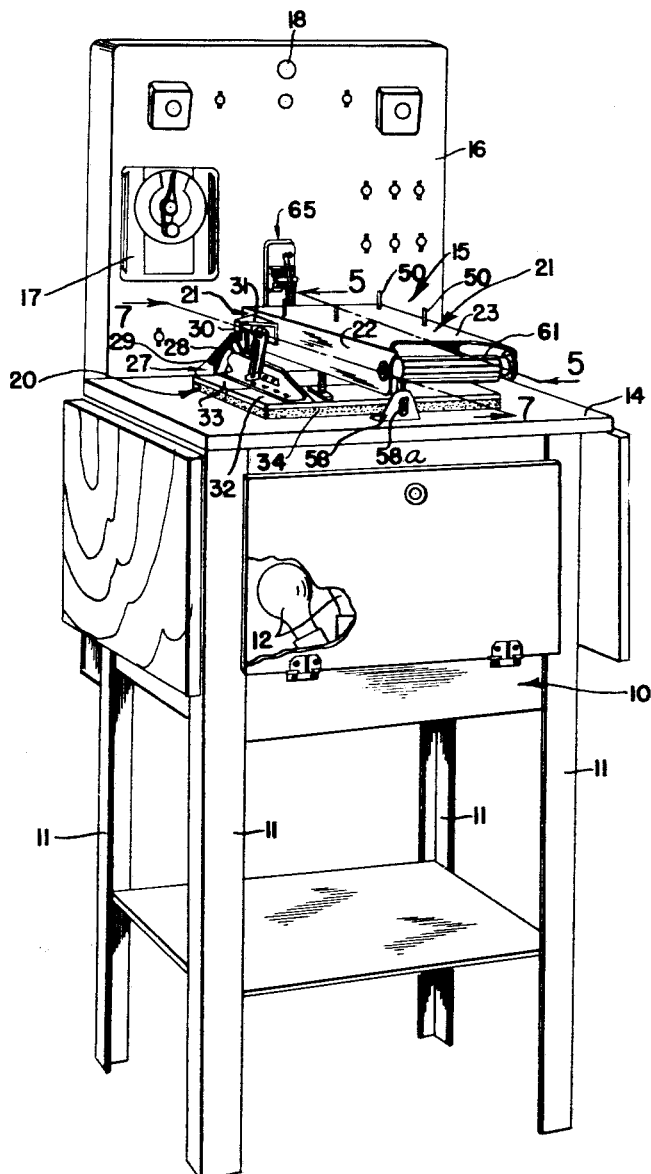
Figure 2 is a view similar to Figure 1, partly broken away, illustrating the pressure platen mechanism in closed position.

Referring particularly to Figures 1 and 2 of the drawings, there is illustrated a photographic printing machine including a housing 10 supported on legs 11, 11 and containing a battery of electric lamps 12, adapted to transmit light through a flat, transparent glass plate 13 mounted flush with the upper face of a flat top 14 of the housing. Light sensitive paper may be pressed upon a photographic negative on the plate 13 by means of a platen mechanism, indicated generally at 15. At the rear of the housing there is provided an upright panel 16 on which is a timer mechanism 17, a signal light 18 and various operating switches of known type.

With particular reference to Figures 1, 2, 4 and 7, the improved platen mechanism 15 includes a segmental platen 20 floatingly suspended from a support 21 which is pivotally mounted rearwardly of the glass plate 13 to be swingable from a substantially vertical open position, as shown in Figure 1, to a horizontal, forwardly extending closed position, as best shown in Figures 2, 6 and 7. The support may be of laterally channel-shaped cross-section providing laterally opposite side flanges 22, 22 which are down-turned with respect to a web 23 of the support. The pivotal connection may comprise bearings 24, 24 secured to the inner faces of the flanges 22, at the rearward end of the support, for reception of pins 25, 25 which are also received through similar bearings on upright lugs 26 of a pair of laterally spaced brackets 27, 27 secured to the top 14 of housing 10. At each side of the platen support, a tension spring 28 is extended out of dead-center relation, between an ear 29 on bracket 27 and an ear 30 of a bracket 31 secured to the corresponding side flange 22 of the support, whereby the support tends to be urged toward the open or closed positions depending upon which side of dead-center the support is located.

The platen 20 may comprise rectangular front and rear segments 32 and 33, respectively, having pads 34 and 35 of soft resilient material, such as foam rubber, attached to the undersides thereof, the segments being adapted to be in closely arranged edge-to-edge relationship when the platen is pressed flatly against the plate 13 in the closed position of the mechanism (see Figures 6 and 7).

The segments are floatingly mounted so that in closing the platen mechanism the rear platen 33 may first engage and anchor a sheet of sensitized paper in centered relation on plate 13, over a photographic negative previously placed thereon, and so that the forward platen may thereafter be progressively urged flatly against the paper and negative on the plate, all in a manner which obviates shifting or buckling of the paper. To this end the rear segment 33 is provided with laterally spaced, upstanding flanges 36, 36, rear extensions 36a of which have pivot pins 37 projecting therefrom through vertical slots 38 in the lugs 26 of the corresponding bracket 27, there being substantial clearance in the slots above and below the pins 37 in the fully closed position (Figure 6). The pivot pins 37 tend to be urged upwardly in slots 38 by a tension spring 37a extended between a clip 37b on the underside of support web 23 and an arm 37c projecting rearwardly from the rear segment. Upward movement of the pivot pins 37 may be adjustably limited, as by means of slide plates 27a adjustably secured to the brackets 27, and having angular extensions 27b engageable by the pins 37. The flanges 36 have forward extensions 36b which cooperate with corresponding laterally spaced flanges 39, 39 on the forward platen segment 32, and pivot pins 40 extend through the extension 36a and a vertical slot 41 in the cooperating flanges 39, the resultant lost motion pivotal connection being such that tension springs 42, 42 extended between clips 43 on the flanges 39 of the forward segment and arms 44 on the flanges 36 of the rear segment, tend to urge the forward segment upwardly from the rear edge thereof, out of a common plane of the two segments (see Figures 1, 4 and 5). The front segment is further releasably supported, as by a loop 45 of flexible material, such as leather, secured to the support 21, and through which loop 45 is received a rod 46 between laterally spaced clips 47, 47 secured to the top of the front segment at the forward edge thereof. Thus, in the Figure 1 open position of platen mechanism the platen segments will be floatingly supported substantially in the relative positions shown in Figure 4, wherein the bottom faces of the segments are in upwardly divergent relationship, by which upon closing the platen mechanism the first engagement with the plate 13 will be a paper-anchoring pressure centrally thereof applied by the forward edge of the rear segment.

For independently yieldingly pressing the platen segments against the plate 13, progressively in a manner to be described in greater detail later, spring-pressed detents 48 and 49 are provided on the support 21 in association with segments 32 and 33, respectively. The detents may comprise elongated pins 50 received through aligned apertures in opposite walls of hollow reinforcing cross-member 51 of rectangular cross-section secured to the underside of web 23 of the platen support, the pins normally being yieldingly urged toward downwardly projecting stop position of cotter pins 52 and the detent pins 50, against inner faces of the bottom walls of the cross-members 51, by compression springs 53 extended between the bottoms of the cross-member and heads 54 on the lower ends of the pins. Thus, as the platen support 21 is moved toward closed position (see Figure 4) the head 54 of detent 49 will first engage the top of rear platen segment 33 and yieldingly urge the same flatly against the plate 13 (see Figure 5), then the front segment 32, which has by this time become engaged at its forward edge with the plate 13, will be similarly yieldingly urged flatly against the plate by the detent 48 (see Figures 6 and 7).

For releasably locking the support 21 in the closed position (Figures 2, 6 and 7) a latch 55, pivoted at 56 to depend from the underside of support web 23, has a notched forward edge providing a finger 57 engageable within a slot or opening 58a in an upstanding catch 58 fixed on the top 14 of the housing, as urged by spring means 59 to be described later, the lower end of the latch having a beveled cam portion 60 engageable with the top of the catch as the platen support is swung downwardly to swing the latch rearwardly against the action of the spring means 59, until the latter urges the latch into said locked position. The latch may be released by a slight rotation of a hand grip 61 rotatably positioned between the opposite flanges 22, at the forward end of support 21, to swing the latch rearwardly through a link 62 pivotally connected between an arm extension 63 from the hand grip and a relatively short, laterally off-set arm 64 which is rotatable with the latch.

Figure 3:
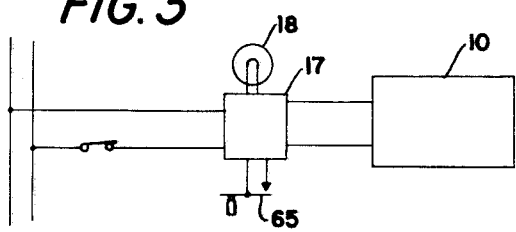
Figure 3 is a simple wiring diagram of the electrical connections in the machine.

As best shown in Figure 3, switch means 65, may be provided for closing an electrical circuit including the battery of illuminating lamps 12 in housing 10, at the instant the latch 58 snaps into locked position, a timer mechanism 17 being provided in the circuit to maintain the lamps in illuminated condition for a predeterminate length of time necessary to make a contact print from a photographic negative. The colored signal lamp 18 on panel 16 is maintained lit by the timer during such period.

The switch means 65 may be a micro-switch including a pivoted arm 68 normally held in open position of the switch by a compression spring 69, the switch being positioned on the front of panel 16 to have the spring-pressed end of the arm 68, in the fully closed position of platen support, pressed inwardly by the inner free end 70 of an elongated rod 71 which is slidably received through aligned apertures in the cross-members 51. The forward end of rod 71 is pivotally connected to an arm 72 pivoted to a lug 73 extending from the forward cross-member, a link 74 being pivotally connected between a downward extension 75 of arm 72 and the off-set arm 64 of latch 55. The aforementioned spring means 59 may constitute a tension spring extended between the extension 75 of arm 72 and the pivot pin at 56, tending to swing the rod 71 to the right and to swing the latch 55 to the left, as indicated in full and chain-dotted lines in Figure 5. It will be seen from Figure 5 that cam engagement between the latch 55 and catch 58 will urge the latch toward the chain-dotted position against the action of spring 59, and at the same time move the rod to the left to permit movement of the inner end thereof to be past the lower end of switch arm 68 when the latch is about to move into locked engagement with catch 58. In the fully locked position of the latch, best shown in Figures 6 and 7, the spring 59 will have urged the rod 71 to the right, thereby to close the switch means 65 and start a printing cycle of operation of the timer mechanism.

The operation of the above described photoprinting machine will now be described in terms of one closing and opening cycle of operation of the platen mechanism 15.

First, with the platen mechanism raised, as shown in Figure 1, the operator centers a sheet of sensitized paper on the glass plate, in known manner, over a photographic negative (not shown), then he grasps the hand grip 61, and without turning the same, urges the platen support toward the closed position.

Due to angular arrangement of the platen segments, as the support is lowered, the soft padding 35 at the forward edge of rear segment 33 will make an initial anchoring engagement with the paper centrally of the plate 13, as shown in Figure 4. With a slight further downward movement of support 21, as shown in Figure 5, engagement of detent 49 with the top of rear segment 33 will urge the same flatly against the paper and negative on the plate, against the resiliency of detent spring 53, spring 28 tending to lift the segment at the rear thereof, and the resilient pad 35.

Meanwhile, as the support is moved from the position of Figure 4 to the position of Figure 5, the forward edge of pad 34 on the front segment will have engaged plate 13, so that when the detent 48 first moves into engagement with the front segment the rear edge of the same will be elevated above the plate 13, by action of spring 42 urging the front segment upwardly of the rear segment to the limit of engagement of pin 40 with the bottom of slot 41. At this point of engagement of the detent 48 the loop 45 will have released supporting engagement with the rod 46. Completion of the downward movement of the support causes the detent 48 to apply pressure to the front segment, thereby firmly to press the same flatly against the paper and negative on the plate against the yielding resiliency of spring 42, detent spring 53, and the rubber pad 34. Thus, the above described successive movements of the front and rear segments is effective to engage and smooth out the sensitized paper from a point centrally and rearwardly thereof, and then to engage the front segment at a point substantially forwardly of the central portion of the paper, so that upon the front segment being urged into flat engagement, as described, there is a resultant slight forward smoothing out of the paper away from the anchored rearward portion thereof (see Figures 1, 6 and 7).

With the forementioned completion of movement of the platen support 21, from the position of Figure 5 to the position of Figures 6 and 7, the latch 55 engaging the catch 58 will move rearwardly from the full line position of Figure 5 to the chain-dotted position thereof, until the finger 57 cooperates with the slot of the catch, allowing the spring 59 to urge the latch forwardly on pivot 56 to the locked position of Figures 6 and 7. The resulting reciprocal movement of the latch is effective, through link 74 and arm 72, to shift the rod 71, first forwardly to permit movement of tip end 70 thereof into cooperation with the lower end of switch arm 68, and then rearwardly to swing the arm 68 on its pivot against the action of spring 69, thereby to close the normally open switch 65. In this manner the switch will be closed only when the platen mechanism is locked, as described, in fully closed condition.

Closing the switch 65 starts the timer mechanism which lights the battery of lamps 12 as indicated by the signal lamp 18. After a predetermined length of time sufficient to expose the sensitized paper properly, the timer cuts off the illumination of the lamps 12 and of the signal lamp 18. After lamp 18 goes out the operator noticing this fact may grasp the hand grip 61 and turn the same a small fraction of a revolution, which through link 62 swings latch 55 rearwardly and unlocks the support and permits the operator to swing the platen mechanism upwardly to the fully open position of Figure 1, ready for another cycle of operation, release of the tip 70 of rod 71 from the arm 68 in the meantime being effective to reset the switch 65 in the normally open condition.

Thus, has been provided a photoprinting machine wherein the platen mechanism is substantially self-operating, in conjunction with closing movement of the platen support, to press sensitized photographic sheets against the lamp housing plate 13 in a manner which obviates wrinkling or buckling the paper, or shifting the paper out of centered relation with respect to the photographic negative or the plate 13.

Modifications of the invention may be resorted to without departing from the spirit thereof or the scope of the appended claims.

What is claimed is:

1. Photoprinting apparatus, comprising a housing containing illuminating means and having a top provided with a transparent light-transmitting plate as for receiving thereon a sensitized sheet over a negative, a platen including front and rear segments adapted to be flatly positioned against said plate in edge-to-edge relationship, mounting means on said top rearwardly of said plate, a platen support pivoted on said mounting means to be swingable toward and from a closed position overhanging said plate, said segments being flexibly connected at the adjacent inner edge portions thereof, suspension means for suspending said segments from said support to be yieldingly shiftable relatively of the same, said rear segment being normally positioned initially to engage at its forward edge with the sheet on the plate when the support is swung forwardly on its pivot toward closed position, yielding means between said support and rear segment operable to press the rear segment flatly against the sheet against the resiliency of said suspension means from said initially engaging position, said front segment being positioned with respect to said support and the rear segment whereby upon continued closing movement of the support the forward edge portion of the front segment will first engage the sheet against the sheet on the plate, yielding means being provided between said support and front section and thereafter operable by final closing movement of the support to press the front segment flatly against the sheet against the resiliency of said suspension means, said flexible connection including a pin and slot pivotal attachment between the segments and spring means tending to urge the pin toward one end of its slot.

2. Photoprinting apparatus, comprising a housing containing illuminating means and having a top provided with a transparent light-transmitting plate as for receiving thereon a sensitized sheet over a negative, a platen including front and rear segments adapted to be flatly positioned against said plate in edge-to-edge relationship, mounting means on said top rearwardly of said plate, a platen support pivoted on said mounting means to be swingable toward and from a closed position overhanging said plate, said segments being flexibly connected at the adjacent inner edge portions thereof, suspension means for suspending said segments from said support to be yieldingly shiftable relatively of the same, said rear segment being normally positioned initially to engage at its forward edge with the sheet on the plate when the support is swung forwardly on its pivot toward closed position, interengaging means on said support and said rear segment independent of said suspension means operable to press the rear segment flatly against the sheet against the resiliency of said suspension means from said initial front edge engaging position, said front segment being positioned with respect to said support and the rear segment whereby upon continued closing movement of the support the forward edge portion of the front segment will first engage the sheet against the sheet on the plate, interengaging means being provided on said support and front section independent of said suspension means thereafter operable by final closing movement of the support to press the front segment flatly against the sheet against the resiliency of said suspension means, said flexible connection including a pin and slot pivotal attachment between the segments, said suspension means including a flexible element between said support and the forward edge portion of the front segment, a pin and slot connection between the rear segment and said mounting means permitting vertical movement of the segment relatively of said top, spring means between said support and rear portion of the rear segment tending to urge the rear segment toward the support as permitted by said pin and slot connection between the same, and spring suspension means from said rear segment to the rear portion of said front segment tending to urge the front segment relatively of the rear segment toward said support as limited by said pin and slot attachment between the segments.

3. Photoprinting apparatus, comprising a housing containing illuminating means and having a top provided with a transparent light-transmitting plate as for receiving thereon a sensitized sheet over a negative, a platen including front and rear segments adapted to be flatly positioned against said plate in edge-to-edge relationship, mounting means on said top rearwardly of said plate, a platen support pivoted on said mounting means to be swingable toward and from a closed position overhanging said plate, said segments at adjacent inner edge portions thereof having lost-motion pivotal connection between the same permitting movement of one segment with respect to the other at said pivotal connection in direction angularly of the plane of the platen in flatwise condition and operable to offset one said inner edge portion with respect to the other in direction toward said support, spring means at said pivotal connection tending to urge the inner edge portions of the segments to the offset condition thereof, yielding suspension means for suspending said segments from said support to be yieldingly shiftable relatively of the same, one said rear segment being normally positioned with reference to said support initially to engage at its forward edge with the sheet on the plate when the support is swung forwardly on its pivot toward closed position, yieldable detent means on said support and said one segment independent of said suspension means operable to press the segment flatly against the sheet against the resiliency of said suspension means from said initially engaging position, the other said segment being positioned with respect to said support and said one segment whereby upon continued closing movement of the support the forward edge portion of said other segment will first engage the forward edge thereof against the sheet on the plate, yieldable detent means being provided on said support and said other segment thereafter operable by final closing movement of the support to press said other segment flatly against the sheet against the resiliency of said spring means at said pivotal connection at the inner edge portions of the segments, said spring means yieldingly tending to return said inner edge portions to said flatwise condition of the platen.

4. Photoprinting apparatus, comprising a housing containing illuminating means and having a transparent light-transmitting plate, as for receiving thereon a sensitized sheet over a negative, a platen including front and rear segments adapted to be flatly positioned against said plate in edge-to-edge relationship, a platen support overhanging said segments and pivoted on the housing rearwardly of said plate to be swingable from and toward said plate, means for mounting said segments to float with respect to said support and relatively of each other and to be swingable with the support, spring-pressed detent means mounted between said support and on one of said segments operable by shifting said support toward said plate to position said one segment flatly against the sensitized sheet, spring-pressed detent means mounted between said support and the other said segment operable by continued said shifting of the support to press said other segment toward flat engagement with said sheet in said edge-to-edge relationship of both segments, a switch having a member yieldingly depressible for operating the illuminating means, an element mounted on said support to be shiftable toward and from yielding engagement of a free end of the element with said switch member, a catch mounted on said housing forwardly of said plate, a latch pivoted on said support and engageable with said catch to lock the support in the closed position thereof against the action of the spring-pressed detent yieldingly pressing against said other segment, said catch and latch having interengageable cam portions adapted to swing the latch on its pivot outwardly of the catch, spring means for swinging the latch back and into said locked position, and means connecting said latch and the other end of said element for urging the same rearwardly upon the latch being yieldingly swung into said locked position, said rearward movement of the element in the closed position of said support thereby shifting said element toward said yielding engagement with said switch member to operate the switch.

5. Photoprinting apparatus, comprising a housing containing illuminating means and having a transparent light-transmitting plate, as for receiving thereon a sensitized sheet over a negative, a platen including front and rear segments adapted to be flatly positioned against said plate in edge-to-edge relationship, a platen support overhanging said segments and pivoted on the housing rearwardly of said plate to be swingable from and toward said plate, means for mounting said segments to float with respect to said support and relatively of each other and to be swingable with the support, spring-pressed detent means mounted between said support and on one of said segments operable by shifting said support toward said plate to position said one segment flatly against the sensitized sheet, spring-pressed detent means mounted between said support and the other said segment operable by continued said shifting of the support to press said other segment toward flat engagement with said sheet in said edge-to-edge relationship of both segments, a switch having a member yieldingly depressible for operating the illuminating means, an element mounted on said support to be shiftable toward and from yielding engagement of a free end of the element with said switch member, a catch mounted on said housing forwardly of said plate, a latch pivoted on said support and engageable with said catch to lock the support in the closed position thereof against the action of the spring-pressed detent yieldingly pressing against said other segment, said catch and latch having interengageable cam portions adapted to swing the latch on its pivot outwardly of the catch, spring means for swinging the latch back and into said locked position, means connecting said latch and the other end of said element for urging the same rearwardly upon the latch being yieldingly swung into said locked position, said rearward movement of the element in the closed position of said support thereby shifting said element toward said yielding engagement with said switch member to operate the switch, a hand grip rotatably mounted at the forward end of said support and having an arm extending therefrom and rotatable therewith, and a link pivotally connected between said arm and said latch, said hand grip being manually rotatable to swing said arm thereof, and through said link yieldingly to swing said latch to unlocked position outwardly of the catch.

6. Photoprinting apparatus, comprising a housing containing illuminating means and having a top provided with a transparent light-transmitting plate as for receiving thereon a sensitized sheet over a negative, a platen including front and rear segments adapted to be flatly positioned against said plate in edge-to-edge relationship, mounting means on said top rearwardly of said plate, a platen support pivoted on said mounting means to be swingable toward and from a closed position overhanging said plate, said segments at adjacent inner edge portions thereof having lost-motion pivotal connection between the same whereby one segment is movable with respect to the other at said pivotal connection to offset one said inner edge portion with respect to the other in direction toward said support, spring means at said pivotal connection tending to urge the inner edge portions of the segments to the offset condition thereof, yielding suspension means for suspending said segments from said support to be yieldingly shiftable relatively of the same, one said rear segment being normally positioned with reference to said support initially to engage at its forward edge with the sheet on the plate when the support is swung forwardly on its pivot toward closed position, yieldable detent means on said support and said one segment independent of said suspension means operable to press the segment flatly against the sheet against the resiliency of said suspension means from said initially engaging position, the other said segment being positioned with respect to said support and said one segment whereby upon continued closing movement of the support the forward edge portion of said other segment will first engage the forward edge thereof against the sheet on the plate, yieldable detent means being provided on said support and said other segment thereafter operable by final closing movement of the support to press said other segment flatly against the sheet against the resiliency of said spring means at said pivotal connection at the inner edge portions of the segments, a switch having a member yieldingly depressible for operating the illuminating means, an element mounted on said support to be shiftable toward and from yielding engagement of a free end of the element with said switch member, a catch mounted on said housing forwardly of said plate, a latch pivoted on said support and engageable with said catch to lock the support in the closed position thereof, said catch and latch having interengageable cam portions adapted to swing the latch on its pivot outwardly of the catch, spring means for swinging the latch back and into said locked position, and means connecting said latch and the other end of said element for urging the same rearwardly upon the latch being yieldingly swung into said locked position, said rearward movement of the element in the closed position of said support thereby shifting said element toward said yielding engagement with said switch member to operate the switch.

7. Photoprinting apparatus, comprising a housing containing illuminating means and having a top provided with a transparent light-transmitting plate as for receiving thereon a sensitized sheet over a negative, a platen including front and rear segments adapted to be flatly positioned against said plate in edge-to-edge relationship, mounting means on said top rearwardly of said plate, a platen support pivoted on said mounting means to be swingable toward and from a closed position overhanging said plate, said segments at adjacent inner edge portions thereof having lost-motion pivotal connection between the same whereby one segment is movable with respect to the other at said pivotal connection to offset one said inner edge portion with respect to the other in direction toward said support, spring means at said pivotal connection tending to urge the inner edge portions of the segments to the offset condition thereof, yielding suspension means for suspending said segments from said support to be yieldingly shiftable relatively of the same, one said rear segment being normally positioned with reference to said support initially to engage at its forward edge with the sheet on the plate when the support is swung forwardly on its pivot toward closed position, yieldable detent means on said support and said one segment independent of said suspension means operable to press the segment flatly against the sheet against the resiliency of said suspension means from said initially engaging position, the other said segment being positioned with respect to said support and said one segment whereby upon continued closing movement of the support the forward edge portion of said other segment will first engage the forward edge thereof against the sheet on the plate, yieldable detent means being provided on said support and said other segment thereafter operable by final closing movement of the support to press said other segment flatly against the sheet against the resiliency of said spring means at said pivotal connection at the inner edge portions of the segments, a switch having a member yieldingly depressible for operating the illuminating means, an element mounted on said support to be shiftable toward and from yielding engagement of a free end of the element with said switch member, a catch mounted on said housing forwardly of said plate, a latch pivoted on said support and engageable with said catch to lock the support in the closed position thereof, said catch and latch having interengageable cam portions adapted to swing the latch on its pivot outwardly of the catch, spring means for swinging the latch back and into said locked position, means connecting said latch and the other end of said element for urging the same rearwardly upon the latch being yieldingly swung into said locked position, said rearward movement of the element in the closed position of said support thereby shifting said element toward said yielding engagement with said switch member to operate the switch, a hand grip rotatably mounted at the forward end of said support and having an arm extending therefrom and rotatable therewith, and a link pivotally connected between said arm and said latch, said hand grip being manually rotatable to swing said arm thereof, and through said link yieldingly to swing said latch to unlocked position outwardly of the catch.

References Cited in the file of this patent

UNITED STATES PATENTS

| | | |
|---|---|---|
| 1,230,532 | Sterling | June 19, 1917 |
| 1,349,384 | McIntire | Aug. 10, 1920 |
| 1,486,867 | Dye et al. | Mar. 18, 1924 |
| 2,224,839 | Steiner | Dec. 10, 1940 |